United States Patent
Shiota et al.

(10) Patent No.: US 6,727,021 B1
(45) Date of Patent: Apr. 27, 2004

(54) LITHIUM ION SECONDARY BATTERY

(75) Inventors: Hisashi Shiota, Tokyo (JP); Hiroaki Urushibata, Tokyo (JP); Tetsuo Mitani, Tokyo (JP); Fusaoki Uchikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,244

(22) PCT Filed: Dec. 25, 1997

(86) PCT No.: PCT/JP97/04853

§ 371 (c)(1),
(2), (4) Date: Jun. 26, 2000

(87) PCT Pub. No.: WO99/34469

PCT Pub. Date: Jul. 8, 1999

(51) Int. Cl.⁷ ............................. H01M 4/62; H01M 4/66
(52) U.S. Cl. ..................... 429/232; 429/212; 429/217; 429/162
(58) Field of Search ................................. 429/212, 214, 429/217, 232, 127, 152, 162

(56) References Cited

U.S. PATENT DOCUMENTS

| | | | |
|---|---|---|---|
| 3,944,432 A | 3/1976 | Brinkmann et al. | |
| 4,416,915 A | 11/1983 | Palmer et al. | |
| 4,794,059 A | * 12/1988 | Hope et al. | 429/231.6 |
| 5,415,948 A | 5/1995 | Gauthier et al. | |
| 5,525,441 A | * 6/1996 | Reddy et al. | 429/127 |
| 5,542,163 A | 8/1996 | Chang | |
| 5,569,564 A | 10/1996 | Swierbut et al. | |
| 5,856,773 A | 1/1999 | Chandler et al. | |
| 5,981,107 A | * 11/1999 | Hamano et al. | 429/129 |
| 6,027,835 A | * 2/2000 | Fukumura et al. | 429/233 |
| 6,124,061 A | 9/2000 | Hamano et al. | |
| 6,346,345 B2 | 2/2002 | Shiota et al. | |

FOREIGN PATENT DOCUMENTS

| | | | | |
|---|---|---|---|---|
| JP | 06231749 A | * | 8/1994 | H01M/02/34 |
| JP | 07161389 A | * | 6/1995 | H01M/10/50 |
| JP | 7-220755 | | 8/1995 | |

OTHER PUBLICATIONS

Blakemore, Solid State Physics Second Edition, Cambridge University Press, 1985 p. 152 (no month).*

* cited by examiner

*Primary Examiner*—Carol Chaney
(74) *Attorney, Agent, or Firm*—Oblon, Spivak, McClelland, Maier & Neustadt, P.C.

(57) ABSTRACT

A multilayer electrode battery which restrains temperature rise produced by an internal short circuit and has a compact size and a large battery capacity. The battery is a multilayer electrode battery which uses an electrode formed by providing positive temperature coefficient characteristics to at least one of an active material and an electronic conductive material in contact with the active material, and a collector of at least one of a positive electrode and a negative electrode, and which has a plurality of layers of multilayer electrode bodies.

8 Claims, 8 Drawing Sheets

LITHIUM ION SECONDARY BATTERY

TECHNICAL FIELD

The present invention relates to a lithium ion secondary battery, and more specifically, to an improvement in the level of the battery safety.

BACKGROUND ART

With recent improvement in performance of electronic appliances, a battery used for a power source of electronic appliances, especially a rechargeable secondary battery has been demanded to improve performance thereof. The lithium ion secondary battery is paid attention to, because it can drive electronic appliances for longer hours, be light and portable, and have high capacity. In spite of the advantage of high energy density, the lithium ion secondary battery is required to provide a sufficient measure for safety because lithium metal and a non-aqueous electrolyte are used.

As a measure for safety it has been conventionally suggested to incorporate a safety valve which releases increased internal pressure, or a PTC element which increases resistance in accordance with the heat generated from external short circuit to break an electric current.

For example, as disclosed in Japanese Unexamined Patent Publication No.328278/1992, a safety valve and a PTC element are attached to the positive electrode cap of a cylindrical battery. However, the safety value is generally designed not to operate easily because its operation may cause water contained in the air to invade into a battery to react with lithium in the negative electrode.

On the other hand, the PTC element successively breaks an external short-circuit without causing any troubles. As a safety component running firstly at the emergency of the battery, the PTC element can be designed to run when the battery reaches a temperature of at least 120° C. due to a short circuit.

By the way, at occurrence of a short-circuit inside the battery, breaking of the external circuit by the PTC element does not mean the breaking of the short-circuit inside the battery. When the short-circuit inside the battery increases a temperature of the battery, a polyethylene or polypropylene separator disposed between the positive electrode and the negative electrode is expected to melt and release or confine a non-aqueous electrolyte contained therein to decrease its ion conductivity, thereby reducing the short-circuit current.

However, the separator away from the heating part does not always melt. To solve the problem, Japanese Unexamined Patent Publication No.161389/1995 proposed use of positive electrode active material particles having a PTC property.

However, resistance of the positive electrode active material having the PTC property is about $10^{-5}$ S/cm at a temperature in use (around a room temperature), the battery does not function unless the positive electrode is formed by adding a conductive aid to the positive electrode active material having the PTC property as disclosed in Example. Addition of a conductive aid having no PTC properties allows the short-circuit current to flow via the conductive aid when the positive electrode active material has a PTC property.

The present invention has an object to solve the above-mentioned problems and to provide a lithium ion secondary battery with a high level of safety to reduce heat generated by external and internal short-circuits.

DISCLOSURE OF INVENTION

The first lithium ion secondary battery of the present invention comprises a plurality of electrode laminates formed by arranging a separator holding an electrolyte, a first electrode and a second electrode, wherein the electrodes have an active material on both sides of the separator, an electronic conductive material in contact with the active material, and an electronic conductive current collector jointed with the active material and the electronic conductive material with a binder, and wherein the active material, the electronic conductive material, or the electronic conductive material current collector of at least one of the electrodes has property of increasing resistance with increasing a temperature. Consequently, at occurrence of a short-circuits inside the battery, the short-circuit current can be reduced automatically by PTC function of either the active material and the electronic conductive material in the route of the short-circuit current or the electronic conductive material used for the positive electrode current collector to reduce an increase of a temperature.

The second lithium ion secondary battery of the present invention is that in the first lithium ion secondary battery a plurality of the electrode laminates are formed by alternately arranging the first electrode and the second electrode between a plurality of divided separators and jointing them with an adhesive agent.

The third lithium ion secondary battery of the present invention is that in the first lithium ion secondary battery a plurality of the electrode laminates are formed by alternately arranging the first electrode and the second electrodes between a coiled separator and jointing them with an adhesive agent.

The fourth lithium ion secondary battery of the present invention is that in the first lithium ion secondary battery a plurality of electrode laminates are formed by alternately arranging the first electrode and the second electrode between a folded separator and jointing them with an adhesive agent.

Since the electrode laminates are formed by adhesive in the present invention, no strong outer can is needed when the structure has a plurality of electrode laminates, a laminated electrode-type compact battery can be obtained, which is compact and safe and has large battery capacity.

The fifth lithium ion secondary battery of the present invention is that in the first lithium secondary battery the active material comprises a part having an electrode activity and a part having no electrode activity, and the part having no electrode activity increases resistance with increasing a temperature. Thereby, the temperature rise can be reduced by increasing reactive resistance of the active material at an occurrence of a short-circuit.

The sixth lithium ion secondary battery of the present invention is that in the first lithium secondary battery the active material is secondary particles comprising a plurality of active material particles having on their surfaces electronic conductive particles of which resistance increases with increasing a temperature. Thereby, a temperature rise can be reduced by increasing reactive resistance of the active material at an occurrence of a short-circuit.

The seventh lithium ion secondary battery of the present invention is that in the first lithium secondary battery the electronic conductive current collector has a property of increasing resistance with increasing a temperature, and the electrode active material layer containing the active material comprises a plurality of parts electronically insulated and separated. Thereby, it is prevented that at an occurrence of a short-circuit, the active material layer becomes a bypass of the short-circuit current to disturb a decrease in the short-circuit current.

The eighth lithium ion secondary battery of the present invention is that in the first lithium secondary battery the electronic conductive current collector comprises a conductive plate and an electronic conductive material which is jointed with the conductive plate and has a property of increasing resistance with increasing a temperature.

The ninth lithium ion secondary battery of the present invention is that in the eighth lithium secondary battery the conductive plate comprises a metal.

The tenth lithium ion secondary battery of the present invention is that in the eighth lithium secondary battery the conductive plate comprises carbon.

Thereby, the battery can be provided with a PITC property, which restricts an increase in a temperature due to an occurrence of a short-circuit inside the battery and offer a high level of safety.

The eleventh lithium ion secondary battery of the present invention is that in the first lithium secondary battery the electronic conductive material is a polymer having a softening temperature of at most 150° C. Thereby, the heat generated by the short-circuit melts a plastic, and the active material has larger electronic conductive resistance by interrupting both the electronic conductive route and the ion conductive route. When it is used for an electronic conductive material, the electronic conductive route can be interrupted.

BEST MODE FOR CARRYING OUT THE INVENTION

Embodiments of the present invention is explained as follows with reference to the drawings.

Figure 1:
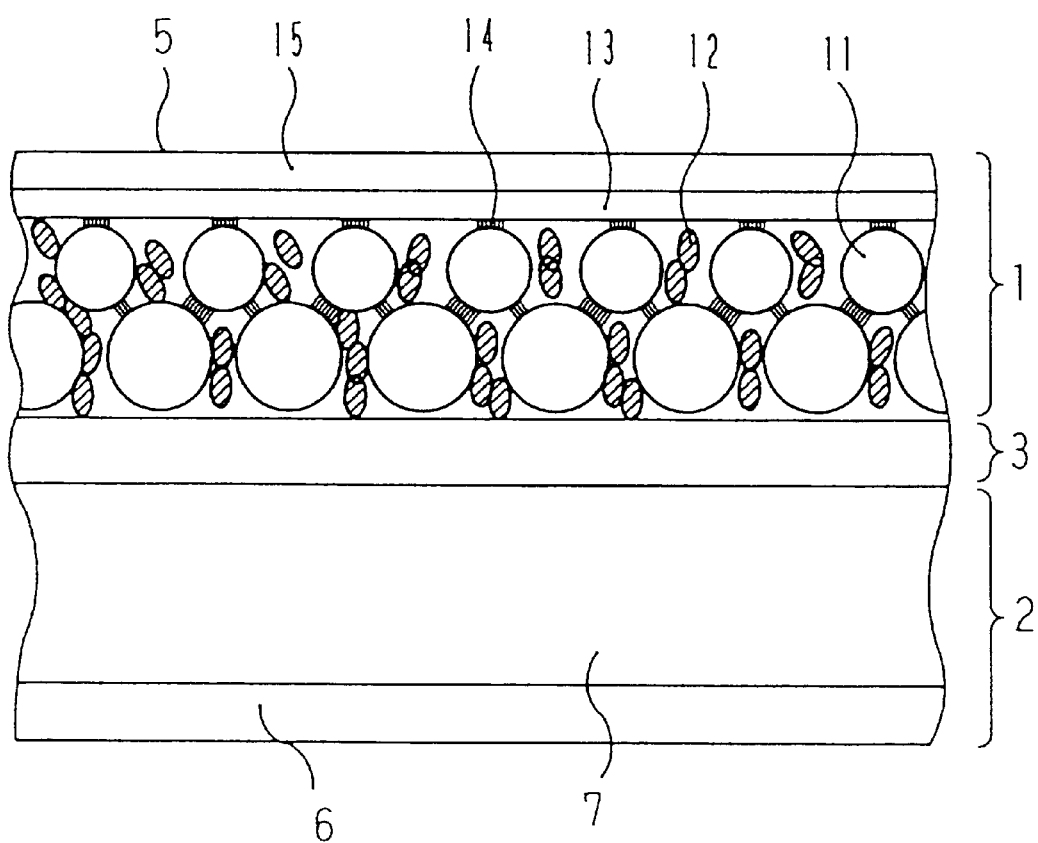
FIG. 1 is a cross sectional view showing one embodiment of the laminated electrodes in the lithium ion secondary battery of the present invention.
Figure 2:
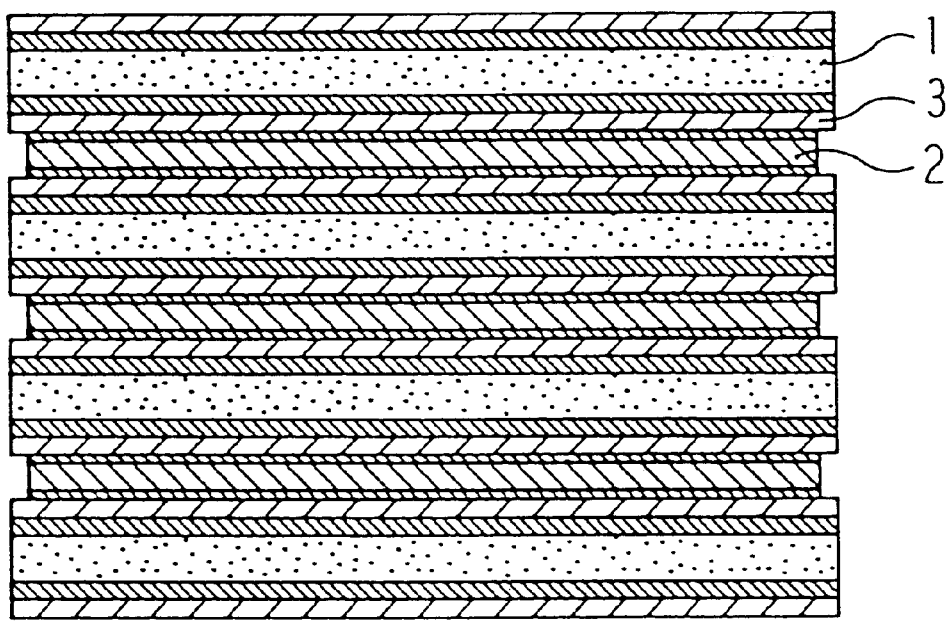
FIGS. 2, 3, and 4 are cross sectional views showing the main part of one embodiment of the lithium ion secondary battery of the present invention.
Figure 3:
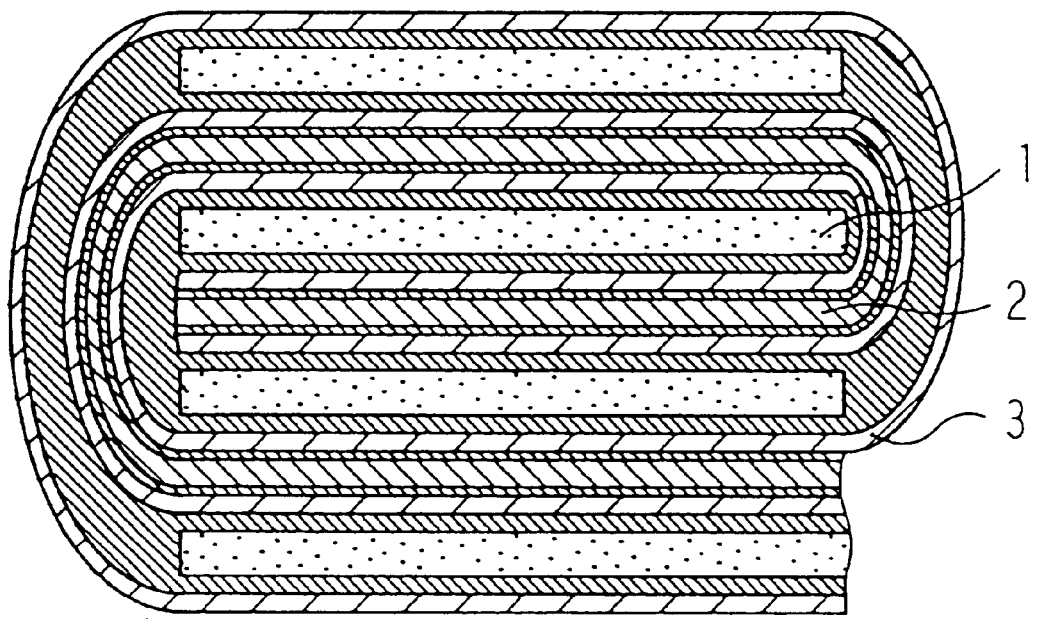
Figure 4:
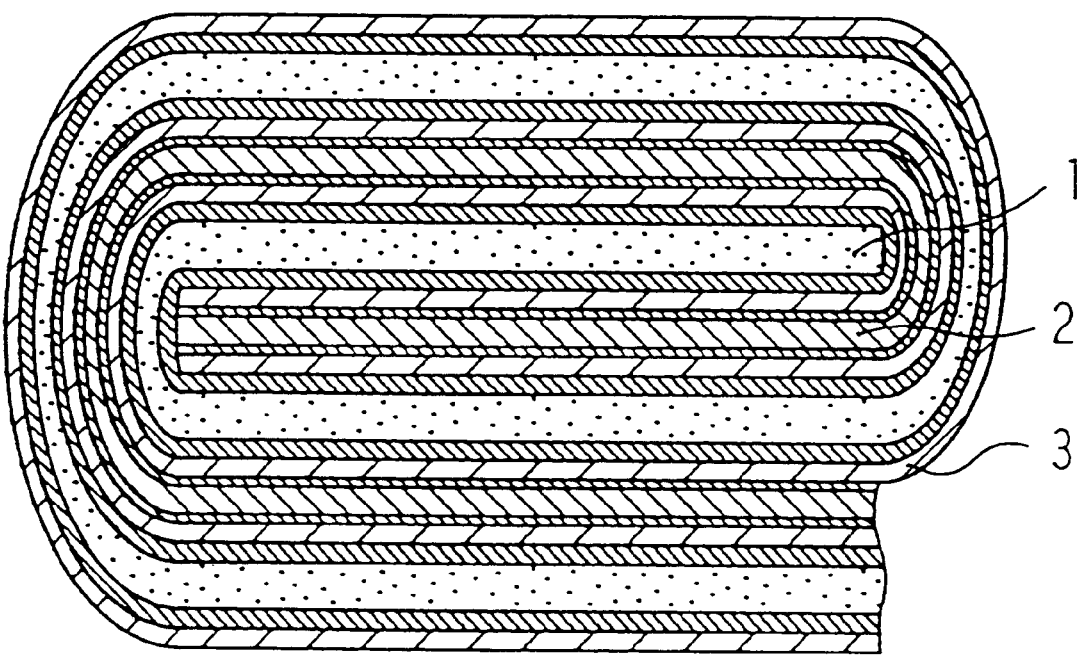

FIG. 1 is a cross sectional view of the laminated electrodes in the lithium ion secondary battery of the present invention, and FIGS. 2, 3, and 4 are sectional views showing the main part of the embodiment of the lithium ion secondary battery of the present invention, wherein a plurality of electrode laminates are formed by alternately arranging a negative electrode and a positive electrode between either each one of the divided separators or coiled separators.

In the figure, numeral 1 is a positive electrode comprising a positive electrode current collector 5 and a positive electrode active material layer formed on the positive electrode current collector 5 and comprising a positive electrode active material 11 and an electronic conductive material 12 in contact with the positive electrode active material 11 with a binder 14. Numeral 2 is a negative electrode comprising a negative electrode current collector 6 made of a metal such as copper and a negative electrode active material layer formed on the negative electrode current collector 6 and comprising a negative electrode active material 7 such as carbon particles formed with a binder. Numeral 3 is a separator holding an electrolyte containing lithium ions. The separator 3, the positive electrode 1, and the negative electrode 2 are jointed each other with an adhesive agent.

In the structure shown in FIG. 1, the positive electrode active material 11, the positive electrode current collector 5, or the electronic conductive material 12 in contact with the positive electrode active material 11 has a PIC property (wherein resistance increases with increasing a temperature) in the present invention.

FIG. 1 shows the structure of the positive electrode 1 in detail, but the negative electrode 2 may have the same structure as the positive electrode 1. Namely, the electronic conductive material in contact with the particle-like negative electrode active material 7 may be formed with a binder to form the negative electrode 2, and the negative electrode active material 7, the electronic conductive material in contact with the negative electrode active material 7, or the negative electrode current collector 6 is provided with a PTC property.

Figure 5:
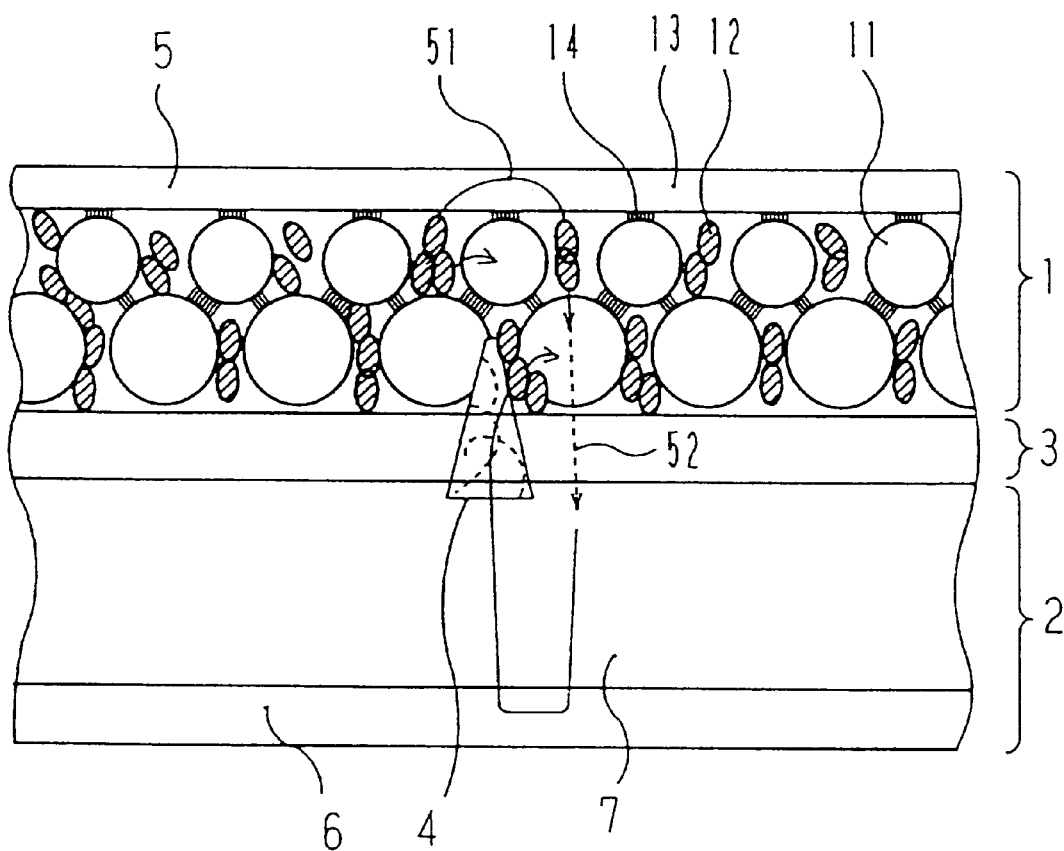
FIG. 5 is a cross sectional view explaining operation in the state of an internal short-circuit of the battery.

FIG. 5 is a cross sectional view explaining an operation in the state of an internal short-circuit of the battery. As shown in the figure, when a deposit 4, which is a dendrite deposit of lithium metal, causes an internal short-circuit in the negative electrode 2, the short-circuit currents 51 and 52 flow along the route indicated with the arrows intensively to the internal short-circuit regions. The short-circuit current 51 is an electric current of electron conductive and the short-circuit current 52 is an electric current of ion conductive. The regions, to which the short-circuit currents 51 and 52 are concentrated, generate heat due to Joule loss to increase a temperature. Namely, the temperature increases concentratedly in the region near the short-circuit caused by the deposit 4, wherein the short-circuit currents 51 and 52 flow.

Since the PTC property is given to either the positive electrode active material 11, the electronic conductive material 12, which are the route of the short-circuit current 51, or an electronic conductive material 13 composing the positive electrode current collector 5, the short-circuit current 51 can be decreased automatically even if the heat is generated by short-circuit.

Voltage loss due to internal resistance of a battery under an electric current of normal use is 1 to 5% of the battery voltage. At an occurrence of a short-circuit, when the entire voltage is applied to the internal resistance portion, the short-circuit current is assumed to flow 20 to 100 times as much as the normal current. Consequently, when the internal resistance of the short-circuit portion becomes at least 100 times as much as the normal resistance due to the PTC function, it is considered that the short-circuit current also becomes below the level of the normal current.

Although thermal runaway depends on the materials composing the battery, the possibility is considered to increase when the battery temperature becomes at least 150° C. The operation temperature to initiate an operation of the PTC function is preferably 150° C. at which the thermal runaway is restricted, and more preferably 120° C. when the time delay from starting to completion is considered.

In FIG. 1 it is preferable that at least one of the current collectors 5, 6, the active materials 7, 11 and the electronic conductive material 12 has the PTC property.

Since the source of the short-circuit current is the active materials 7 and 11 of the positive electrode 1 and the negative electrode 2, respectively, it is most effective that the active materials 7 and 11 themselves have the PITC property. The temperature rise due to a short-circuit increases the reactive resistance of the active materials 7 and 11 to decrease the short-circuit current.

The reactive resistance of the active materials is considered to be a sum of electronic conductive resistance and ion conductive resistance inside the active materials, and charge transfer resistance on the surfaces of the active materials 7, 11. The electronic conductive resistance of the active material 11 is inherently high in many cases, and the main components of the reactive resistance are usually the ion conductive resistance inside the active material 11 and the charge transfer resistance on the surface of the active material 11. In one structure of the present invention, the reactive resistance indicates the PTC property. Concretely, the electronic conductive particles having the PTC property on the surface of the active material particles are entangled to form the active materials 7 and 11, which are secondary particles comprising an active part and an inactive part having the PTC property.

It is also effective that the electronic conductive material has the PTC property. Since the positive electrode active material 11 itself usually has low electronic conductivity, the electronic conductive material 12 is added to form the positive electrode 1 in such a way that the positive electrode active material 11 is contacted with the electronic conductive material 12. The short-circuit current can be reduced by the electronic conductive material having the PIC property.

In order to make the positive electrode current collector 5 have the PTC property, the electronic conductive material 13 having the PTC property is jointed with the conductive plate 15 comprising a metal or the like, as shown in FIG. 1. The negative electrode current collector 6 can have the PTC property in the same manner. Alternatively, the conductive plate may comprise carbon.

Figure 6:
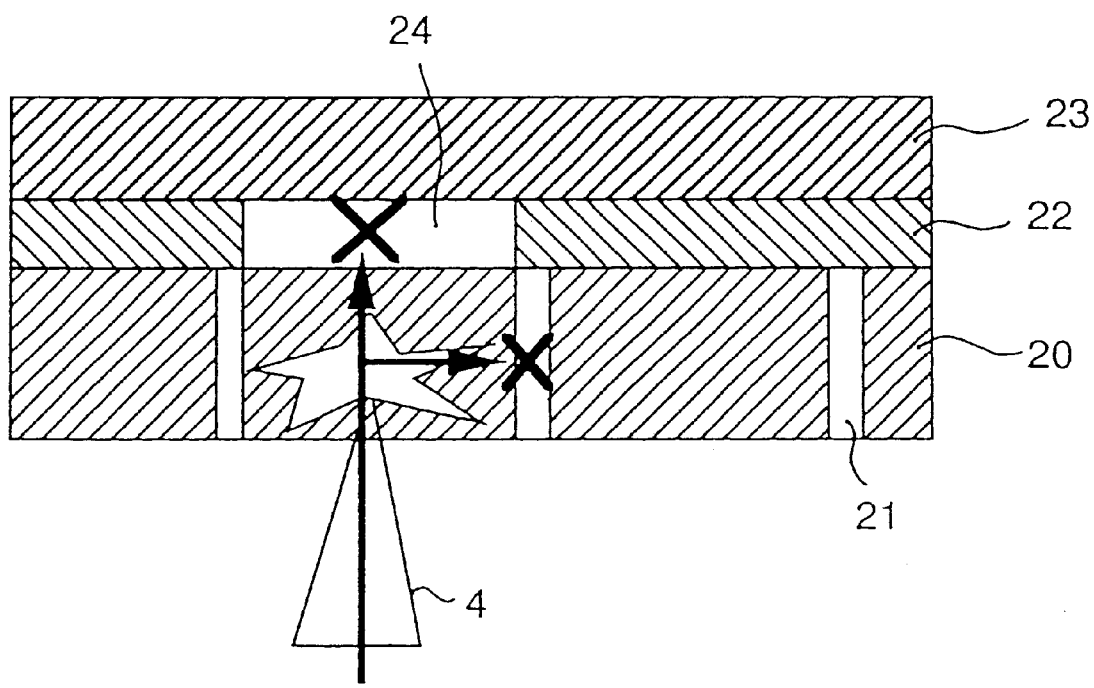
FIG. 6 is an illustration explaining structure of the electrodes and operation in the state of an internal short-circuit of the battery in one embodiment of the present invention.

When only the current collectors 5, 6 are exclusively provided the PTC property, and the active material layer obtained by arranging each of the active materials 11, 7 with the binder 14 has good electronic conductivity in the lateral direction, there may be cases that the short-circuit current cannot be sufficiently reduced in spite of an increase in resistance of the current collectors 5, 6 during a short-circuit because the active material layer functions as a bypass of the short-circuit current. Therefore, as shown in FIG. 6, the electrode active material layer 20 is divided into a plurality of regions by the electronic insulator 21.

Such a structure prevents the bypass of the short-circuit current (indicated with an arrow in the drawing), so that the short-circuit current is interrupted at an early stage in the interruption zone 24 by the PTC function of the layer (PTC layer) 22 having the PTC property which is formed on the surface of the electrode current collector 23. Consequently, the release of the energy due to the short-circuit is small enough to secure the safety.

It is also possible to provide spaces instead of the electronic insulators 21 in order to electronically divide the active material layer 20 into a plurality of regions, and there is no limitation for size and arranging intervals of the spaces or the electronic insulators 21 to divide the active material layer 20, the type of the electronic insulators, and the material to be filled into the spaces. Concerning the material, it is obvious that an electronically insulating material used for a lithium ion secondary battery is preferable in the environment where the electrode is used; for example, an inside of the lithium ion secondary battery. It is also obvious that the size of the spaces or the electronic insulator is preferably as small as possible within the range securing the function to interrupt a bypass of the short-circuit current, and that the arranging intervals are preferably as wide as possible in the viewpoint of spoiling the inherent function of the electrode.

Figure 7:
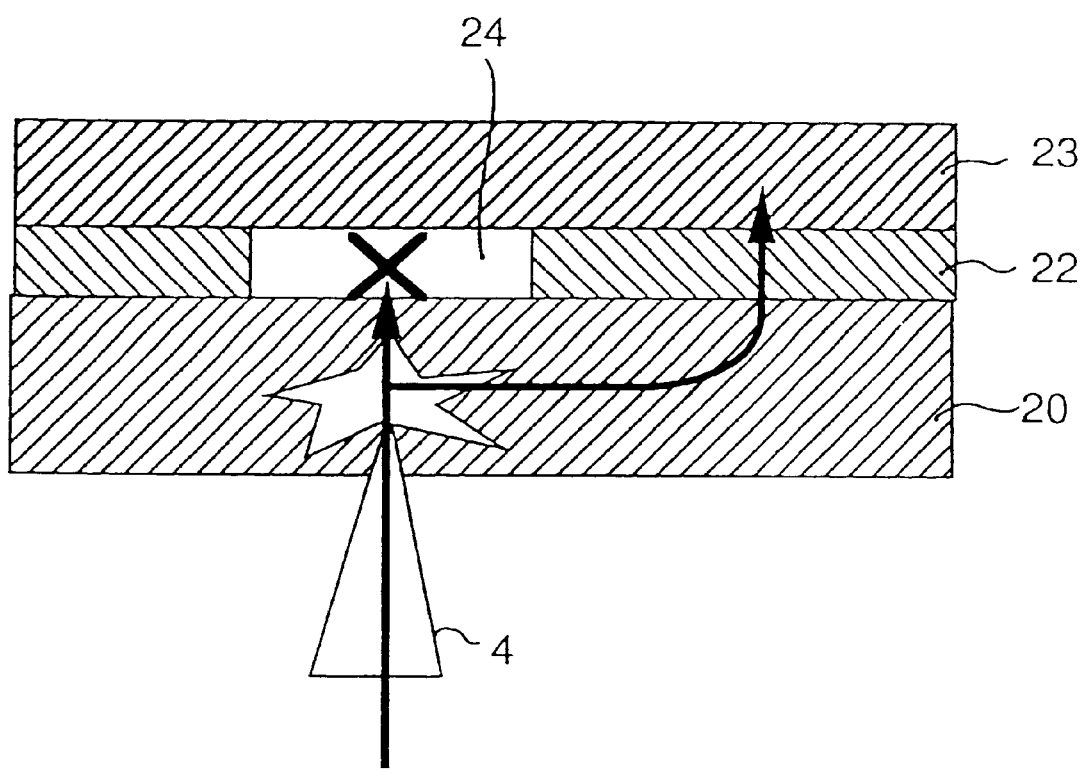
FIG. 7 is an illustration explaining structure of the electrodes and operation in the state of an internal short-circuit of the battery of Comparative Example.

In contrast, in the electrode structure shown in FIG. 7 of Comparative Example wherein only the current collector is exclusively provided with the PTC property, and the active material layer 20 obtained by arranging active materials with a binder is formed uniformly on the entire surface of the PTC layer 22 of the current collector, when the active material layer 20 has a short-circuit for any reason, a short-circuit current involving heat generation (shown with the arrow in the figure) flow if the active material layer 20 has good electron conductivity in the lateral direction. At that moment, a temperature rises greatly at the vicinity of the region where the short-circuit occurs, which stimulates the PTC function of the current collector to decrease the short-circuit current flowing the region. However, when the electronic conductive resistance inside the active material layer 20 is small, the short-circuit current continues to flow according to bypassing the interruption zone 24 which has been formed by the PTC function as shown in FIG. 7. The continuous flow of the short-circuit current widens the range of heat generation, thereby expanding the interruption zone 24 to force the short-circuit current to bypass. Therefore, the short-circuit current continues to flow until the PTC layer functions in the range wherein it is difficult to make the bypass of the short-circuit, during the time a large amount of energy is released in the case of a battery.

Consequently, when the current collector is provided with the PTC function, it is necessary to restrict the electronic conductivity of the active material layer in the lateral direction by, for example, dividing the active material layer into a plurality of parts.

As for the active material or the active material particles themselves forming the above-mentioned secondary particles, the positive electrode active material 11 can be particles made of $LiCoO_2$, $LiNiO_2$, $LiCo_{,1-x}Ni_xO_2$, or $LiMn_2O_4$, and the negative electrode active material 7 can be a material having no PTC properties as carbon particles such as mesophase carbon micro bead (MCMB), graphite, and acetylene black.

As the electronic conductive material or the electronic conductive particles having the PTC property, barium titanate, a composite oxide of Sr- or Pb-doped barium titanate, and a conductive polymer obtained by adding carbon black to polyethylene can be used. But those are not limited thereto.

The PTC function of the above-mentioned conductive polymer is controlled by a mixing ratio of a plastic and the conductive materials such as carbon black. If the conductive polymer is used, the plastic melts due to the heat generated by a short-circuit, and in the active material comprising the secondary particles, the electronic conductive resistance can be increased by interrupting both the electronic conductive route and the ion conductive route. Alternatively, when it is applied to the electronic conductive materials 12 and 13, the electronic conductive route can be interrupted.

As the adhesive agent to joint the separator 3, the positive electrode 1 and the negative electrode 2, the material can be used, which is not dissolved in an electrolyte and become a porous film without causing an electrochemical reaction inside the battery. Examples thereof are a fluororesin, a mixture containing a fluororesin as the main component, poly(vinyl alcohol), or a mixture containing poly(vinyl alcohol) as a main component. Concrete examples thereof are a polymer or a copolymer having a fluorine atom such as vinylidene fluoride, ethylene tetrafluoride in its molecular structure, a polymer or a copolymer having vinyl alcohol in its molecular structure, or a mixture of poly(methyl methacrylate), polystyrene, polyethylene, polypropylene, poly(vinylidene chloride), poly(vinyl chloride), polyacrylonitrile, poly(ethylene oxide). Among those, poly (vinylidene fluoride) as a fluororesin is appropriate.

The Examples of the lithium ion secondary battery of the present invention will be described in detail as follows.

EXAMPLE 1

Preparation of the Positive Electrode

A positive electrode active material paste was prepared by dispersing 10 parts by weight of electronic conductive material fine particles (average particle size of 10 $\mu$m), which have a PTC property, conductivity of 5 S/cm at a room temperature and of 5 $\mu$S/cm at an operation temperature of 120° C., 85 parts by weight of an active material comprising $LiCoO_2$, and 5 parts by weight of vinylidene fluoride (hereinafter referred to as PVDF) into N-methyl pyrrolidone (hereinafter referred to as NMP). The positive electrode active material paste was applied as thick as 150 $\mu$m by a doctor blade process on a 20 $\mu$m-thick aluminum foil forming the positive electrode current collector 5 to form a positive electrode active material film. After being dried at 80° C., the film was pressed to prepare the positive electrode 1 containing a positive electrode active material layer 11 having 100 $\mu$m-thick.

As the electronic conductive material having the PTC property, barium titanate, Sr (strontium)-doped barium titanate, Pb (lead)-doped barium titanate, and a mixture of graphite-polyethylene were respectively used.

Preparation of Negative Electrode

A negative electrode active material paste prepared by dispersing 95 parts by weight of mesophase carbon micro bead (hereinafter referred to as MCMB) and 5 parts by weight of PVDF into NMP was applied as thick as 300 $\mu$m by a doctor blade process on the negative electrode current collector 6 made of a 20 $\mu$m-thick copper foil to form a negative electrode active material film. After being dried at 80° C., the film was pressed to prepare the negative electrode 2 containing a negative electrode active material layer 7 having 100 $\mu$m-thickness.

Preparation of Battery

An NMP solution dissolving 5 parts by weight of PVDF was applied on one side of a porous polypropylene sheet (available from Hoechst, CELL GUARD #2400) which is used as two separators 3. Later, before the adhesive agent was dried, either the positive electrode 1 or the negative electrode 2 was sandwiched between the separators 3, laminated and dried at 80° C.

The separator 3 having the positive electrode 1 (or the negative electrode) therebetween are stamped into a pre-determined size, and the NMP solution was applied on one side of the stamped separator 3, the negative electrode 2 (or the positive electrode) stamped into a pre-determined size was laminated. The NMP solution was further applied on the other side of the stamped separators 3 and laminated to the surface of the negative electrode 2 (or the positive electrode). The process was repeated to form a battery body having an electrode laminate, and the battery body was dried while applying pressure to prepare a battery body with a flat-type lamination structure as shown in FIG. 2.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/$dm^3$ dissolved in a mixed solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. An ambient temperature during the charge was 25° C. After the completion of the charge, an iron nail with a diameter of 2.5 mm was inserted in the center of the battery in order to simulate the internal short-circuit conditions.

Figure 8:
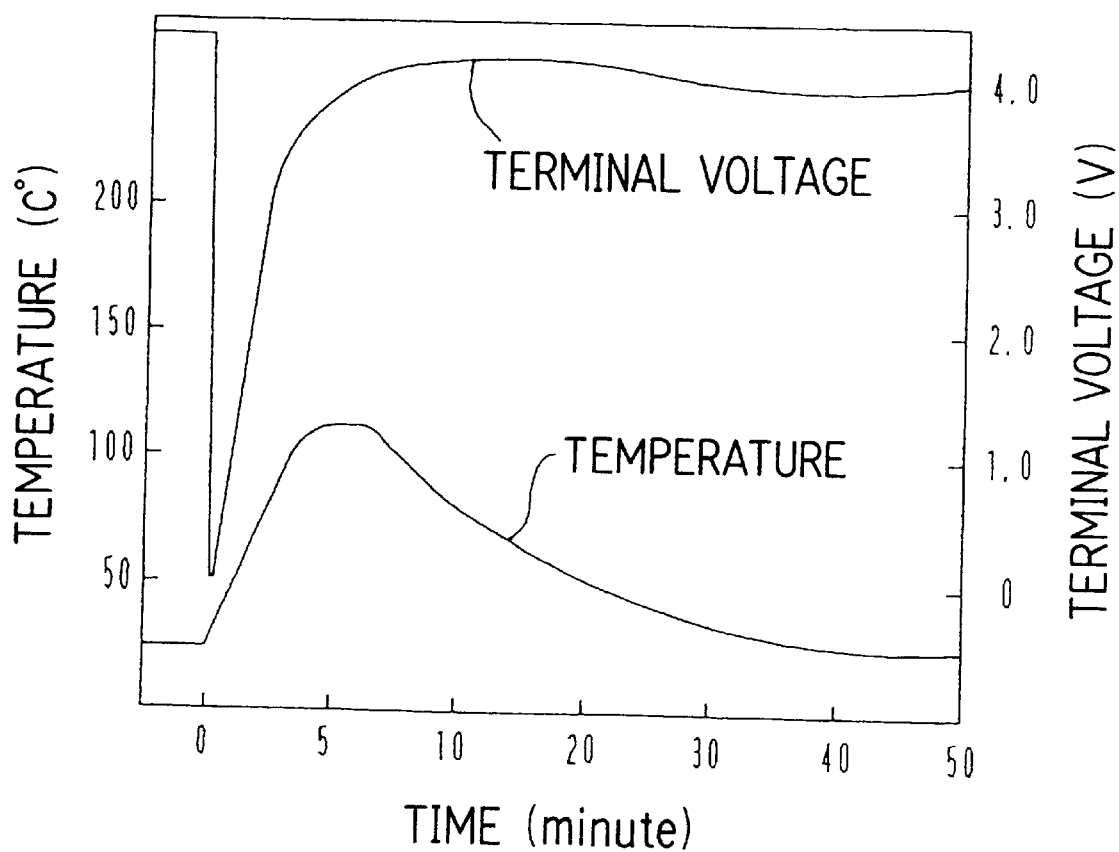
FIG. 8 is an illustration showing changes in a battery voltage and a battery temperature against passing time in an internal short-circuit simulation of the lithium ion secondary battery in one embodiment of the present invention.

FIG. 8 is a graph showing changes in voltage and temperature of the battery against time by the above simulation. As shown in the graph, the moment when the iron nail is inserted (time 0), the terminal voltage drops to 0 V, but it again increases gradually with increasing time. The recovery is considered to result from the heat generated in the short-circuit region immediately after the short-circuit causing the electronic conductive particles having the PTC properties in the vicinity of a short-circuit region to function to reduce the short-circuit current. The battery temperature shown in the graph begins to rise after the short-circuit, reaches its peak after about 5 minutes, and then gradually falls to a room temperature. The time lag in the peak temperature is considered to result from the time required for the heat transfer between the temperature-indicating point and the heat generating point (short-circuits region).

To make a comparison with the present Example, a battery having no PTC function was prepared in the same manner as the present embodiment except that artificial graphite KS-6 (manufactured by LONZA) was used as electronic conductive particles. Then, a simulation test using an iron nail was carried out to find that the peak temperature was over 150° C. and that there was no recovery in the battery voltage.

EXAMPLE 2

Preparation of Positive Electrode

A positive electrode active material paste was prepared by dispersing 85 parts by weight of active material particles having an average particle size of 50 $\mu$m made by entangling high density polyethylene having a softening temperature of 120° C. with $LiCoO_2$ having an average particle size of 1 $\mu$m, 10 parts by weight of artificial graphite KS-6 (manufactured by LONZA) as electronic conductive material particles, and 5 parts by weight of PVDF as a binder into NMP. The positive electrode active material paste was applied as thick as 150 μm by a doctor blade process on an aluminum foil having 20 μm thickness forming the positive electrode current collector 5 to form a positive electrode active material film. After being dried at 80° C., the film was pressed to prepare the positive electrode 1 having a 100 μm thickness positive electrode active material layer 11.

Preparation of Negative Electrode

A negative electrode active material paste prepared by dispersing 95 parts by weight of MCMB and 5 parts by weight of PVDF as a binder into NMP was applied as thick as 150 μm by a doctor blade process on the negative electrode current collector 6 made of a copper foil having 20 μm thickness to form a negative electrode active material film. After being dried at 80° C., the film was pressed to prepare the negative electrode 2 having a 100 μm thickness negative electrode active material layer 7.

Preparation of Battery

An NMP solution dissolving 5 parts by weight of PVDF was applied on one side of a porous polypropylene sheet (Hoechst: CELL GUARD #2400) used as two separators 3. Later, before the adhesive agent was dried, either the positive electrode 1 or the negative electrode 2 was sandwiched between the separators 3, laminated and dried at 80° C.

The separators 3 having the positive electrode 1 (or the negative electrode) therebetween were stamped into a pre-determined size, and the NMP solution was applied on one side of the stamped separators 3, and the negative electrode 2 (or the positive electrode) stamped into a pre-determined size was laminated. The NMP solution was further applied on the other side of the stamped separators 3 and laminated to the surface of the negative electrode 2 (or the positive electrode). The process was repeated to form a battery body having an electrode laminate, and the battery body was dried while applying pressure to prepare a battery body with a flat-type lamination structure as shown in FIG. 2.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/dm$^3$ dissolved in a mixed solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. The ambient temperature during the charge was 25° C. After the completion of the charge, an iron nail with a diameter of 2.5 mm was inserted in the center of the battery in order to simulate the internal short-circuit conditions.

Similar in FIG. 8, the moment when the iron nail is inserted (time 0), the terminal voltage drops to 0 V, but it again increases gradually with increasing time. The recovery is considered to result from the heat generated in the short-circuit region immediately after the short-circuit causing the high density polyethylene entangled in the active material in the vicinity of the short-circuit region to soften and expand to interrupt the electronic conductive route leading to the active material, thereby reducing the short-circuit current.

EXAMPLE 3

Preparation of Positive Electrode

A positive electrode active material paste was prepared by dispersing 85 parts by weight of active material particles consisting of LiCoO$_2$ having an average particle size of 1 μm, 10 parts by weight of artificial graphite KS-6 (manufactured by LONZA) as electronic conductive material particles, and 5 parts by weight of PVDF as a binder into NMP. Then, a mask having 5 mm×5 mm slits at an open area ratio of 70% was applied on the positive electrode current collector 5 comprising a 20 μm thickness aluminum net and a sheet-like conductive polymer (thickness 50 μm), which has the PTC properties, conductivity of 5 S/cm at a room temperature and of 5 μS/cm at an operation temperature of 120° C. which was laminated onto the aluminum net. The positive electrode active material paste was applied as thick as 150 μm by a doctor blade process over the mask, to form a positive electrode active material film divided into a plurality of regions. After being dried at 80° C., the film was pressed to prepare the positive electrode 1 having a positive electrode active material layer 11 having a 100 μm-thick. The sheet-like conductive polymer used here is a mixture of 30% by weight of polyethylene and 70% by weight of carbon black.

Preparation of Negative Electrode

A negative electrode active material paste prepared by dispersing 95 parts by weight of MCMB and 5 parts by weight of PVDF as a binder into NMP was applied as thick as 150 μm by a doctor blade process on the negative electrode current collector 6 made of a 20 μm-thick copper foil to form a negative electrode active material thin film. After being dried at 80° C., the film was pressed to prepare the negative electrode 2 forming a negative electrode active material layer 7 having a 100 μm thickness.

Preparation of Battery

The separators 3 having the positive electrode 1 (or the negative electrode) were stamped into a pre-determined size, and the NMP solution was applied on one side of the stamped separators 3, and the negative electrode 2 (or the positive electrode) stamped into a pre-determined size was laminated. The NMP solution was further applied on the other side of the stamped separators 3 and laminated to the surface of the negative electrode 2 (or the positive electrode). The process was repeated to form a battery body having an electrode laminate, and the battery body was dried while applying pressure to prepare a battery body with the flat-type lamination structure as shown in FIG. 2.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/dm$^3$ dissolved in a mixture solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. The ambient temperature during the charge was 25° C. After the completion of the charge, an iron nail with a diameter of 2.5 mm was inserted in the center of the battery in order to simulate the internal short-circuit conditions.

Similar in FIG. 8, the moment the iron nail is inserted (time 0), the terminal voltage drops to 0 V, but it again increases gradually with increasing time. The recovery is considered to result from the heat generated in the short-circuit region immediately after the short-circuit causing the high density polyethylene entangled in the active material in the vicinity of the short-circuit region to soften and expand to interrupt the electronic conductive route leading to the active material, thereby reducing the short-circuit current.

EXAMPLE 4

Preparation of Positive Electrode

A positive electrode active material paste was prepared by dispersing 85 parts by weight of active material particles comprising $LiCoO_2$ having an average particle size of 1 μm, 10 parts by weight of artificial graphite KS-6 (manufactured by LONZA) as electronic conductive material particles, and 5 parts by weight of PVDF as a binder into NMP. Then, the positive electrode active material paste was applied as thick as 150 μm by a doctor blade process on the positive electrode current collector 5 forming a 20 μm-thick aluminum net to form a positive electrode active material film. After being dried at 80° C., the film was pressed to prepare the positive electrode 1 having a 100 μm thickness positive electrode active material layer 11.

Preparation of Negative Electrode

A negative electrode active material paste prepared by dispersing 95 parts by weight of particles having an average particle size of 50 μm obtained by entangling high density polyethylene having a softening temperature of 120° C. with MCMB, and 5 parts by weight of PVDF as a binder into NMP was applied as thick as 150 μm by a doctor blade process on the negative electrode current collector 6 made of a copper foil having 20 μm thickness to form a negative electrode active material film. After being dried at 80° C., the film was pressed to prepare the negative electrode 2 having a 100 μm thickness negative electrode active material layer 7.

Preparation of Battery

The separators 3 having the positive electrode 1 (or the negative electrode) were stamped into a pre-determined size, and the NMP solution was applied on one side of the stamped separators 3, and is the negative electrode 2 (or the positive electrode) stamped into a pre-determined size was laminated. The NMP solution was further applied on the other side of the stamped separators 3 and laminated to the surface of the negative electrode 2 (or the positive electrode). The process was repeated to form a battery body having an electrode laminate, and the battery body was dried while applying pressure to prepare a battery body with the flat-type lamination structure as shown in FIG. 2.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/$dm^3$ dissolved in a mixture solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. The ambient temperature during the charge was 25° C. After the completion of the charge, an iron nail with a diameter of 2.5 mm was inserted in the center of the battery in order to simulate the internal short-circuit conditions.

Similar in FIG. 8, the moment when the iron nail is inserted (time 0), the terminal voltage drops to 0 V, but it again increases gradually with increasing time. The recovery is considered to result from the heat generated in the short-circuit region immediately after the short-circuit causing the high density polyethylene entangled in the active material in the vicinity of the short-circuit region to soften and expand to interrupt the electronic conductive route leading to the active material, thereby reducing the short-circuit current.

EXAMPLE 5

By using the positive electrode 1 and the negative electrode 2 shown in Examples 1 to 4, a lithium ion secondary battery was prepared having the battery body of the coiled-type lamination structure shown in FIG. 3.

Preparation of Battery

An NMP solution dissolving 5 parts by weight of PVDF was applied to one side of each of the two sheet-like separators 3 made of a porous polypropylene sheet (available from Hoechst, CELL GUARD #2400). A sheet-like negative electrode 2 (or the positive electrode) was disposed between these sides on which the NMP solution was applied to be laminated. Then, they were kept in a warm air drier for two hours at 80° C. to evaporate NMP.

The NMP solution dissolving 5 parts by weight of PVDF was applied to one side of the sheet-like separators 3 having the negative electrode (or the positive electrode) therebetween. One end of the separators 3 was folded in a predetermined amount to sandwich the positive electrode 1 (or the negative electrode) therebetween, and was passed through a laminator together. The NMP solution dissolving 5 parts by weight of PVDF was further applied to the other side of the sheet-like separators 3, and another positive electrode 1 (or another negative electrode) was laminated to the position opposite the positive electrode (or negative electrode) sandwiched earlier. The separators 3 were coiled to form an oval, and further coiled with another positive electrode 1 (or the negative electrode) laminated thereto. The process was repeated to form a battery body having an electrode laminate, and the battery body was dried while applying pressure to prepare a battery body with the flat-type lamination structure as shown in FIG. 3.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/dm$^3$ dissolved in a mixture solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. The ambient temperature during the charge was 25° C. After the completion of the charge, an iron nail with a diameter of 2.5 mm was inserted in the center of the battery in order to simulate the internal short-circuit conditions. Similar changes in temperature and voltage of the battery to those in FIG. 8 were observed. The moment when the iron nail is inserted (time 0), the terminal voltage drops to 0 V, but it again increases gradually with increasing time. The recovery is considered to result from the heat generated in the short-circuit region immediately after the short-circuit causing the electronic conductive particles having the PTC properties in the vicinity of a short-circuit region to function to interrupt the electronic conductive route leading to the active material, thereby reducing the short-circuit current.

In the present Example the method coiling the separators 3 was shown. Alternatively, the sheet-like separators 3 having a sheet-like negative electrode 2 (or the positive electrode) laminated therebetween can be folded with the positive electrode 1 (or the negative electrode) laminated thereto.

EXAMPLE 6

By using the positive electrode 1 and the negative electrode 2 shown in EXAMPLES 1 to 4, a lithium ion secondary battery was prepared having the battery body of the coiled-type lamination structure shown in FIG. 3. The present Example differs from Example 5 only in that the positive electrode 1, the negative electrode 2 and the separators 3 are coiled at the same time.

Preparation of Battery

A sheet-like negative electrode 2 (or the positive electrode) was disposed between two sheet-like separators 3 made of a porous polypropylene sheet (available from Hoechst, CELL GUARD #2400) and a sheet-like positive electrode 1 (or the negative electrode) was disposed outside one of the separators 3 to be protruded in a pre-determined amount. An NMP solution dissolving 5 parts by weight of PVDF was applied on the inner side of each of the separators 3 and the outside surface of the separators 3 where the positive electrode 1 (or the negative electrode) was disposed. The positive electrode 1 (or the negative electrode), two separators 3, and the negative electrode 2 (or the positive electrode) were combined together and passed through a laminator. Then, the NMP solution dissolving 5 parts by weight of PVDF was applied on the outside surface of the other one of the separators 3, and the protruded positive electrode (or the negative electrode) was folded towards the surface with the NMP solution to be laminated. The laminated separators 3 was coiled in such a manner as to wrap the folded positive electrode (or the negative electrode), thereby forming a battery body having an electrode laminate. The battery body was dried while applying pressure to prepare a battery body with the flat-type lamination structure.

The current collecting tabs connected to the respective ends of the positive electrode and negative electrode current collectors of the battery body with the flat-type lamination structure were spot welded between the positive electrodes and between the negative electrodes to electrically connect the battery body with the flat-type lamination structure in parallel.

After being soaked in an electrolyte containing lithium phosphate hexafluoride having a concentration of 1.0 mol/dm$^3$ dissolved in a mixture solvent of ethylene carbonate and dimethyl carbonate (molar ratio of 1:1), the battery body with the flat-type lamination structure was sealed into a bag made from aluminum laminate film with thermal fusion to complete a battery.

The prepared battery was charged at 500 mA until it reached to 4.2 V. The ambient temperature during the charge was 25° C. After the completion of the charge, an iron nail with a diameter of 2.5 mm was inserted in the center of the battery in order to simulate the internal short-circuit conditions. Similar changes in temperature and voltage of the battery to those in FIG. 8 were observed. The moment when the iron nail is inserted (time 0), the terminal voltage drops to 0 V, but it again increases gradually with time. The recovery is considered to result from the heat generated in the short-circuit region immediately after the short-circuit causing the electronic conductive particles having the DTC properties in the vicinity of a short-circuit region to function to interrupt the electronic conductive route leading to the active material, thereby reducing the short-circuit current.

In Examples 1 to 6, changing the number of laminated electrodes has shown that the battery capacity increases in proportion to the number of laminated electrodes.

In Examples 1 to 6, PVDF is used as the adhesive agent; similar properties were obtained with the use of a fluororesin, a mixture mainly comprising a fluororesin, polyvinyl alcohol, or a mixture mainly comprising polyvinyl alcohol.

INDUSTRIAL APPLICABILITY

The secondary battery of the present invention is used for portable electronic appliances such as a portable personal computer and a cellular phone, and realizes downsizing, lightening, and desirable shape of the appliances with an improvement in battery performance.

What is claimed is:

1. A lithium ion secondary battery comprising:
   a plurality of electrode laminates formed by arranging a separator holding an electrolyte, a first electrode and a second electrode,
   wherein the electrodes comprise four distinct components of (a) an active material, (b) an electronic conductive material in contact with the active material, (c) a binder, and (d an electronic conductive current collector jointed with the active material and the electronic conductive material with the binder,
   wherein the electronic conductive material of at least one of the electrodes comprises a conductive filler and a polymer having a softening temperature of at most 150° C., and
   wherein said plurality of electrode laminates are formed by arranging the first electrode, the second electrode and the separator such that the separator is interposed between the first electrode and the second electrode, and jointing at least one of the electrodes and the separator with an adhesive agent.

2. The lithium ion secondary battery of claim 1, wherein a plurality of the electrode laminates are formed by alternately arranging the first electrode and the second electrode between a plurality of divided separators and jointing them with an adhesive agent.

3. The lithium ion secondary battery of claim 1, wherein a plurality of the electrode laminates are formed by alternately arranging the first electrode and the second electrode between a coiled separator and jointing them with an adhesive agent.

4. The lithium ion secondary battery of claim 1, wherein a plurality of the electrode laminates are formed by alternately arranging the first electrode and the second electrode between a folded separator and jointing them with an adhesive agent.

5. A lithium ion secondary battery comprising:

a plurality of electrode laminates formed by arranging a separator holding an electrolyte, a first electrode and a second electrode, wherein the electrodes have an active material on both sides of the separator, an electronic conductive material in contact with the active material, and an electronic conductive current collector jointed with the active material and the electronic conductive material with a binder, wherein the electronic conductive current collector of at least one of the electrodes has a positive temperature coefficient property, and the active material layer facing the electronic conductive current collector of positive temperature coefficient property comprises a plurality of parts electronically separated and insulated, and wherein said plurality of electrode laminates are formed by alternately arranging the first electrode, and the second electrode between a plurality of divided separators and jointing at least one of the electrodes and at least one divided separator of said plurality of divided separators with an adhesive agent.

6. A lithium ion secondary battery comprising:

a plurality of electrode laminates formed by arranging a separator holding an electrolyte, a first electrode and a second electrode, wherein the electrodes have an active material on both sides of the separator, an electronic conductive material in contact with the active material, and an electronic conductive current collector jointed with the active material and the electronic conductive material with a binder, wherein the electronic conductive current collector of at least one of the electrodes has a positive temperature coefficient property, and the active material layer facing the electronic conductive current collector of positive temperature coefficient property comprises a plurality of parts electronically separated and insulated, wherein the electronic conductive current collector comprises a conductive plate and an electronic conductive material which is jointed with the conductive plate and has a positive temperature coefficient property, and wherein the conductive plate comprises carbon.

7. A lithium ion secondary battery comprising:

a plurality of electrode laminates formed by arranging a separator holding an electrolyte, a first electrode and a second electrode, wherein the electrodes have an active material on both sides of the separator, an electronic conductive material in contact with the active material, and an electronic conductive current collector jointed with the active material and the electronic conductive material with a binder, wherein the electronic conductive current collector of at least one of the electrodes has a positive temperature coefficient property, and the active material layer facing the electronic conductive current collector of positive temperature coefficient property comprises a plurality of parts electronically separated and insulated, wherein the electronic conductive current collector comprises a conductive plate and an electronic conductive material which is jointed with the conductive plate and has a positive temperature coefficient property, and wherein the electronic conductive material of the electronic conductive current collector comprises a sheet of conductive polymer.

8. A lithium ion secondary battery comprising:

a plurality of electrode laminates formed by arranging a separator holding an electrolyte, a first electrode and a second electrode, wherein the electrodes have an active material on both sides of the separator, an electronic conductive material in contact with the active material, and an electronic conductive current collector jointed with the active material and the electronic conductive material with a binder, wherein the active material of at least one of the electrodes is secondary particles comprising a plurality of active material particles having on their surfaces electronic conductive particles of a positive temperature coefficient property, and wherein said plurality of the electrode laminates are formed by alternately arranging the first electrode, and the second electrode between a plurality of divided separators and jointing at least one of the electrodes and at least one divided separator of said plurality of divided separators with an adhesive agent.

* * * * *